United States Patent
Denny

[15] 3,653,680
[45] Apr. 4, 1972

[54] TOW TRAILER WITH FOLDING CARRIER PLATFORM

[72] Inventor: Donald I. Denny, La Crosse, Wis.
[73] Assignee: Toter, Inc., La Crescent, Minn.
[22] Filed: Sept. 18, 1970
[21] Appl. No.: 73,392

[52] U.S. Cl. ..........................280/34 A, 280/41 R, 280/402, 280/418, 214/85.1, 214/334
[51] Int. Cl. ......................................B60p 3/06, B62d 53/04
[58] Field of Search...............280/34 A, 34 R, 402, 415, 418, 280/41 R; 214/85, 85.1, 85.5, 86 A, 334

[56] References Cited

UNITED STATES PATENTS

| | | | |
|---|---|---|---|
| 24,895 | 11/1960 | Clements | 280/34 R |
| 2,541,582 | 2/1951 | Hawkins | 280/402 |
| 2,701,069 | 2/1955 | Hawkins | 214/86 A |
| 2,706,055 | 4/1955 | Nichols | 214/86 A |
| 2,707,113 | 4/1955 | Powlick | 280/418 |
| 3,311,245 | 3/1967 | Galey | 214/85 |
| 3,312,362 | 4/1967 | Gilmore | 214/334 |
| 3,199,889 | 8/1965 | Gadbury | 214/34 A |
| 3,547,290 | 12/1970 | Fratzke et al. | 214/506 |

*Primary Examiner*—Leo Friaglia
*Attorney*—Williamson, Palmatier & Bains, H. Dale Palmatier, Herman H. Bains and Malcolm L. Moore

[57] ABSTRACT

A vehicle tow trailer is provided with a vehicle carrier platform supported at its outer end by swivel wheels and having its inner end pivotably supported from the trailer axle for swinging movement about a horizontal axis, whereby said platform may be folded over from a rearwardly extending position of use to a forwardly disposed position wherein an elevated rest on the trailer draw bar supports the platform in overlying relation to the draw bar. The carrier platform is wider than the space between the wheels on opposite ends of the trailer axle, and a pair of laterally spaced support arm structures extending rearwardly from the trailer axle pivotally support the platform at such a location rearwardly of the trailer wheels that the platform clears the trailer wheels when in its rearwardly extending position of use or in its forwardly collapsed storage position.

10 Claims, 8 Drawing Figures

PATENTED APR 4 1972

INVENTOR
Donald I. Denny
BY
Williamson Palmatier & Bains
ATTORNEYS

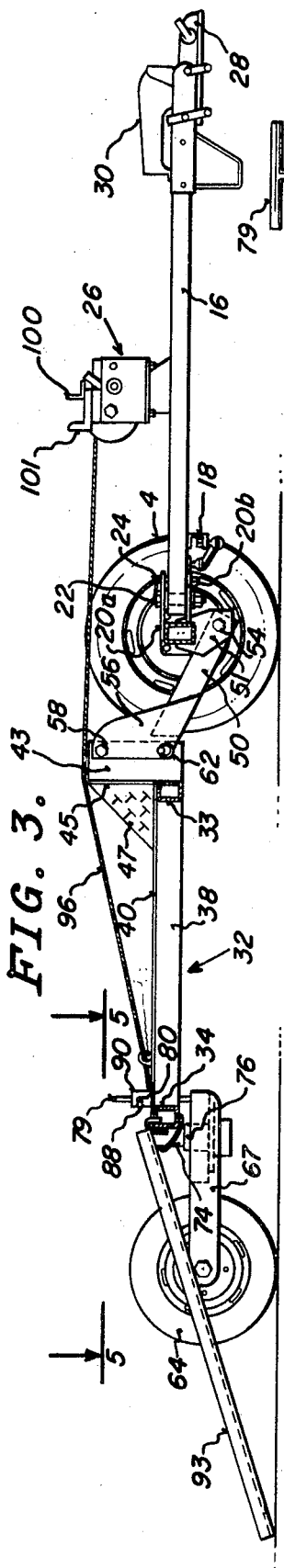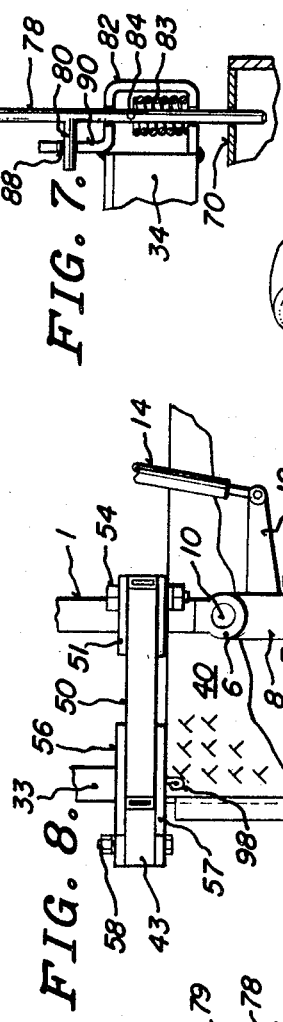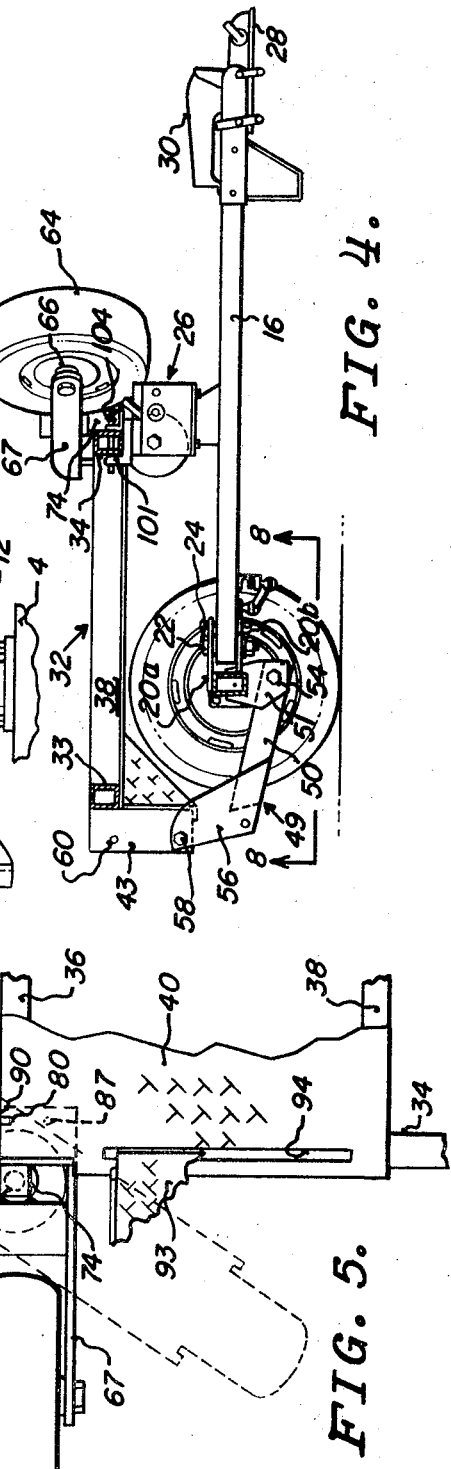

TOW TRAILER WITH FOLDING CARRIER PLATFORM

BRIEF SUMMARY OF THE INVENTION

This invention is directed to a tow trailer particularly characterized by a vehicle carrier platform of sufficient width to support either the front or rear end of a passenger car, tractor, or small truck with the platform being pivotally collapsible from a rearwardly extending position of use wherein swivel wheels support its outer end to a forwardly collapsed, compact storage position in overlying relation to the trailer draw bar. The tow trailer is advantageously of sufficient size to tow vehicles of various sizes from the smallest passenger car to relatively large farm and construction vehicles, but may be collapsed to a very compact form with the rear, swivel wheels of the carrier platform off of the ground when being pulled behind a lead vehicle with no vehicle load in tow.

These objectives are achieved by a carrier platform support structure utilizing swivel wheels at the outer end of the platform and mounting means pivotally supporting the inner end of the platform from the trailer axle to hold the platform in a substantially horizontal, rearwardly extending position of use. The aforesaid mounting means preferably takes the form of a pair of support arm structures attached to the trailer axle at laterally spaced points and extending rearwardly and upwardly therefrom to points of pivotal connection with the inner end of the trailer platform, this arrangement insuring that neither the transverse frame structure of the platform or an upright wall structure at the inner end thereof will strike or be obstructed by the trailer axle or draw bar when the platform is swung upwardly and forwardly to its collapsed position.

The vehicle carrier platform of the trailer advantageously has a width greater than the lateral space between the trailer wheels to permit relatively wide vehicles to be towed. As a particularly important feature of my trailer structure, the inner end of the carrier platform is pivotally connected to the outer ends of support arm structures extending rearwardly from the trailer axle at such locations rearwardly of the trailer wheels that the platform will clear the trailer wheels in its rearwardly extended position of use or when folded inwardly over the draw bar to its collapsed position of non-use.

As a further beneficial aspect of my invention, the aforesaid upright wall structure at the inner end of the carrier platform serves a dual function as a stop means for the wheels of the vehicle being towed and as a means for pivotally mounting the platform. The upright wall structure is pivotally connected at its upper end to the top of upwardly projecting extensions on support arms extending rearwardly from the trailer axle, whereby the upright wall structure will be inverted when the platform is pivoted upwardly and forwardly to its collapsed position and will support the inner end of the platform at an elevated position above the trailer wheels.

These and other objects and advantages of my invention will become readily apparent as the following description is read in conjunction with the accompanying drawings wherein like reference numerals have been used to designate like elements throughout the several views.

BRIEF DESCRIPTION OF THE DRAWINGS

FIG. 3 is a vertical, section view of the tow trailer taken along lines 3—3 of FIG. 2;

FIG. 4 is a vertical, section view similar to FIG. 3 and showing the trailer in collapsed form;

FIG. 5 is a fragmentary, plan view of the rear end of the trailer taken along lines 5—5 of FIG. 3;

FIG. 7 is a fragmentary, enlarged scale view of the rear, swivel wheel locking assembly for the tow trailer; and FIG. 8 is a fragmentary, bottom plan view of the trailer in collapsed form taken along lines 8—8 of FIG. 4;

DESCRIPTION OF THE PREFERRED EMBODIMENT

Figure 1:
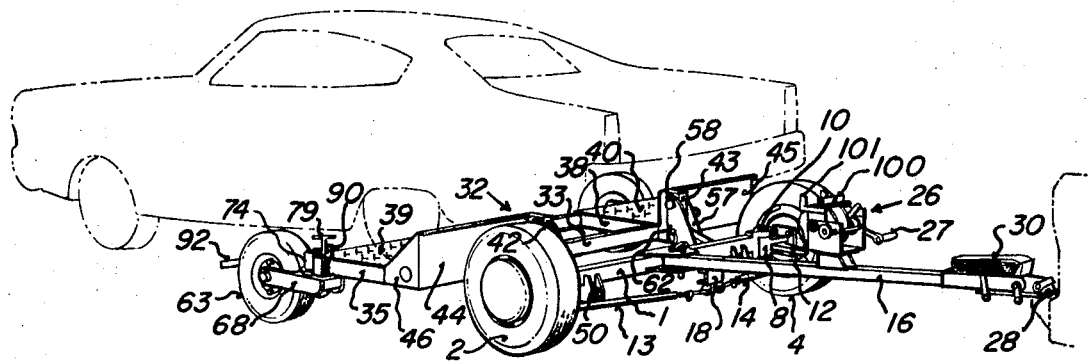
FIG. 1 is a perspective view of the tow trailer of this invention.

Referring to the drawings, I have shown in FIG. 1 a perspective view of the preferred embodiment of the collapsible tow trailer of this invention. As a particularly advantageous feature of my improved tow trailer, I have provided a collapsible or folding structure which operates as a two wheeled trailer when being towed empty in its collapsed condition, and which takes the form of a four wheeled trailer when opened to its load carrying position. To this end, the trailer is comprised of an axle 1 having a pair of wheels 2 and 4 pivotally mounted on the opposite ends thereof for steering movement. The wheel turning assembly includes yokes 6 at the opposite ends of axle 1, wheel spindles 8 and king pins 10 extending therethrough, these elements being shown in both FIGS. 1 and 2. Spindle turning arms 12 are connected by means of a pair of tie rods 13 and 14 to draw bar 16 for actuation thereby, bracket 18 serving as a coupling device between tie rods 13, 14 and draw bar 16. The pivotal attachment of draw bar 16 to axle 1 is accomplished by means of an axle yoke assembly comprised of upper and lower plates 20a and 20b welded to axle 1 and vertically spaced to receive draw bar 16 therebetween. Pivot bolt 22 holds draw bar 16 in place between yoke plates 20a and 20b. Also extending vertically through draw bar 16 and yoke plates 20a and 20b is a removable hitch pin 24 held in place by a spring clip (not shown) inserted through one protruding end thereof. Hitch pin 24, which appears clearly in FIGS. 3 and 4, in combination with yoke bolt 22 prevents the pivotal movement of draw bar 16 when the turning of trailer wheels 2 and 4 is not necessary and desirable for steering purposes. A winch assembly 26 having a hand crank 27 is mounted on draw bar 16, and may be utilized to pull a disabled vehicle up onto the tow trailer as well as to assist in folding the trailer carrying platform to a position of non-use in a manner described below.

At the forward end of draw bar 16 is a socket coupling 28 for attachment to a conventional ball-type of trailer hitch on a towing vehicle. Also mounted on the forward end of draw bar 16 is surge brake 30 of known design which operates in a conventional manner to hydraulically actuate brakes on trailer wheels 2 and 4 when the tow vehicle brakes are applied and a forward surge or thrust is generated on the tow trailer.

Attached to axle 1 for pivotal movement between the open position of use shown in FIG. 3 and the collapsed position of non-use illustrated in FIG. 4 is a vehicle carrier platform generally designated by reference numeral 32. As may be noted most clearly by reference to FIGS. 1, 2, 3 and 6, platform 32 is of rectangular shape and is comprised of a frame assembly incorporating front and rear cross bars 33 and 34 of tubular steel which extend transversely with respect to draw bar 16, and end bars 35 and 36 extending parallel to draw bar 16 and to the longitudinal axis of the entire trailer assembly. Spaced inwardly from end bars 35 and 36 and extending parallel thereto are a pair of intermediate frame bars 37 and 38 which extend between front and rear cross bars 33 and 34 and cooperate therewith in providing a support base for bed plates 39 and 40 on which either the rear or front wheels of a towed vehicle may be received. Intermediate support bars 37 and 38 define therebetween an open space. Welded to the rear face of front cross bar 33 and extending upwardly therefrom when viewing platform 32 in its open position of FIG. 3, are a pair of horizontally spaced, upright frame posts 42 and 43. Posts 42 and 43 are in line with intermediate support bars 37 and 38 respectively. A pair of stop plates 44 and 45 are welded to posts 42 and 43 and extend outwardly therefrom to the lateral extremities of platform 32 defined by end bars 35 and 36. Posts 42, 43 and plates 44, 45 define an upright wall structure which serves as a stop means for the wheels of a towed vehicle having one end supported on platform 32. Reinforcing gusset plates 46 and 47 are welded between the outer ends of stop plates 44 and 45 and end bars 35 and 36.

Carrier platform 32 is attached at its inner end to axle 1 by means of a pair of support arm assemblies 48 and 49. Each of the support arm assemblies is comprised of an arm 50 pivotally secured by means of pivot bolts 54 between retainer brackets 51 and 52 welded to axle 1. A pair of upwardly projecting plates 56, 57 are welded to the opposite sides of lever arms 50 at the outer ends thereof and receive upright frame posts 42 and 43 therebetween. Each of the frame posts 42 and 43 is secured at its upper end, as viewed in FIG. 3, between support arm assembly plates 56, 57 by means of a pivot bolt 58 extending therethrough. At their lower ends each of the posts 42 and 43 is provided with a through aperture 60 by means of which they may be removably secured to upright plates 56 and 57 utilizing a removable lock pin 62 shown in FIGS. 2 and 3.

Figure 2:
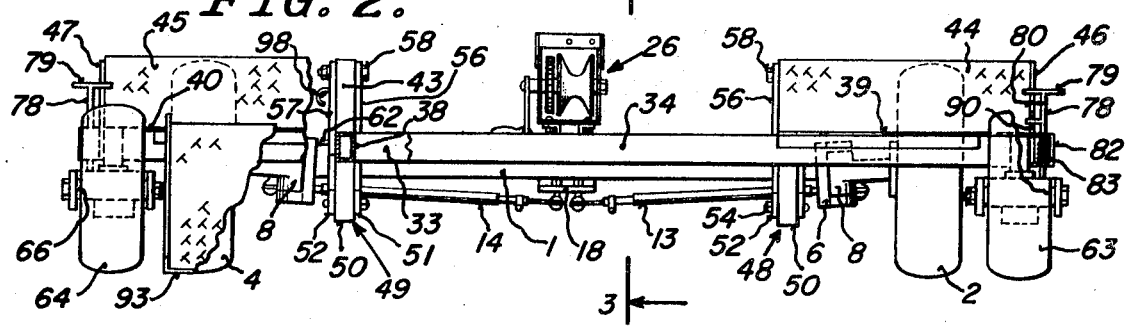
FIG. 2 is a rear elevation view of the tow trailer of FIG. 1.

Carrier platform 32 is provided with a pair of swivel wheels 63 and 64 for supporting the rear end thereof when opened to its position of use shown in FIGS. 1, 2 and 3. Wheels 62 and 63 are rotatably supported on stub axles 66 extending between the side plates 67 and 68 of wheel mounting brackets 70 shown most clearly in FIGS. 2, 3 and 5. Spindles 72 for swivel wheels 63 and 64 are secured to the rear end of carrier platform 32 by means of mounting blocks 74 welded to the opposite sides of rear cross bar 34 of platform 32. Spindles 72 are received within wheel hubs 76 and extend downwardly therethrough as viewed in FIG. 3.

Since I have found it particularly desirable to secure wheels 63 and 64 against swivel movement under particular conditions of use of the tow trailer, I have provided lock means for this purpose which may be best understood by reference to FIGS. 2, 3, 5 and 7. The locking device provided for each swivel wheel consists of a spring-loaded, vertically extending rod 78 having a transverse handle 79 at its upper end and a horizontally extending retention lug 80 extending at right angles thereto. Locking rods 78 are guided vertically within housings 82 secured to end bars 35 and 36 of carrier platform 32 and serving as enclosures for compression springs 83. Springs 83 are contained between the upper and lower walls of guide housings 82 and bear at their upper ends against roll pins 84 extending laterally through locking rods 78. A pair of spaced apart apertures 86 and 87 are provided in one of the top, cross members 71 of spindle wheel mounting brackets 70, and locking rod 78 is urged downwardly against compression spring 83 into engagement within one of the holes 86 or 87 depending upon whether the swivel wheels 63 and 64 are to be locked in a straight, rearward position as shown in solid lines in FIG. 5, or turned inwardly as indicated in phantom lines in FIG. 5. As locking rod 78 is forced downwardly, it is twisted by means of handle 79 to bring retention lug 80 into locking engagement within a horizontally extending slot 88 formed in an upright bracket 90 secured to the top wall of guide housing 82. Compression springs 83 normally urge locking rods 78 upwardly to a position where their lower ends will not be in engagement with either one of the apertures 86 or 87 in spindle wheel mounting brackets 70.

When it is desired to utilize the trailer for towing a vehicle, carrier platform 32 is folded rearwardly and outwardly to the extended position shown in FIGS. 1 and 3. Platform 32 is locked in this substantially horizontal position of use by inserting locking pins 62 through lever arm assembly plates 56 and 57 and the lower ends of upright frame posts 42 and 43. It is to be noted that when carrier platform 32 is swung rearwardly and downwardly to the position shown in FIG. 3, upright posts 43 and 44 will extend between plates 56 and 57 for substantially their entire height with their lower ends positioned to receive lock pins 62. To assist in loading one end of a vehicle onto carrier platform 32, I provide a pair of loading ramps 92 and 93 having downwardly depending flanges at one end thereof by means of which they are hooked into a slot 94 provided in rear cross bar 34 and bed plates 39 and 40. In FIGS. 2 and 3 I have shown one of the loading ramps 93 mounted in its inclined position of use in engagement with cross bar 34. Receiving slot 94 for the ramp flange is shown most clearly in FIG. 5. It is to be appreciated that the mounting arrangement for ramps 92 and 93 is identical at both sides of the rear end of platform 32, and that only one, rear corner of platform 32 is shown in the plan view of FIG. 5. When not being used, ramps 92 and 93 are removed from the platform and stored either in the towing vehicle or on a rack provided on the tow trailer. Either the front or rear end of a vehicle may be carried upon platform 32 of the tow trailer. FIG. 1 shows a vehicle being towed backwards with its rear wheels resting upon carrier platform 32.

If the vehicle to be towed is disabled, winch 26 may be utilized to pull the vehicle up onto carrier platform 32. For this purpose, winch cable 96 is pulled out and attached to one end of the disabled vehicle. Cable 96 is provided at its outer end with a short length of chain having a locking hook thereon for ease of attachment to a vehicle undercarriage. The towed vehicle is pulled up ramps 92 and 93 onto platform 32 with its wheels tight against stop plates 44 and 45 of the carrier platform and is held securely in that position by means of hold down chains, not shown. The chains are secured around the axle or chassis of the towed vehicle and then pulled downwardly tightly, with one of the chain links being engaged over hold down hooks 98 provided on outer plates 57 of the platform lever arm assembly. The cable hook is then released and the cable 96 rewound on winch 36 in order to insure that draw bar 16 will be able to turn freely. Before commencing a towing operation, hitch pin 24 is removed from draw bar 16 so that the draw bar may then pivot about bolt 22. Thus, as draw bar 16 pivots laterally behind the towed vehicle it will operate to turn trailer wheels 2 and 4 through the innerconnecting tie rod arrangement described above in order to insure proper steering action of the tow trailer. When towing a vehicle, rear swivel wheels 63 and 64 are left unlocked in order to insure their freedom to swivel. However, when backing up the tow trailer with a vehicle loaded thereon, swivel wheels 63 and 64 must be locked in a straight back position in order to insure that the trailer may be backed up and guided properly. To accomplish this, wheels 63 and 64 are pivoted to a straight back position as is shown with respect to wheel 64 in FIG. 5, thereby bring aperture 86 in the wheel bracket 70 into vertical alignment with locking rods 78. Rod 78 is then urged downwardly against compression spring 83 into aperture 86 and twisted to engage retention lug 80 within slot 88 of bracket 90. With rod 78 engaging wheel mounting bracket 70 through aperture 86 therein, the swivel wheel assembly will not be free to pivot about spindle 72.

Figure 6:
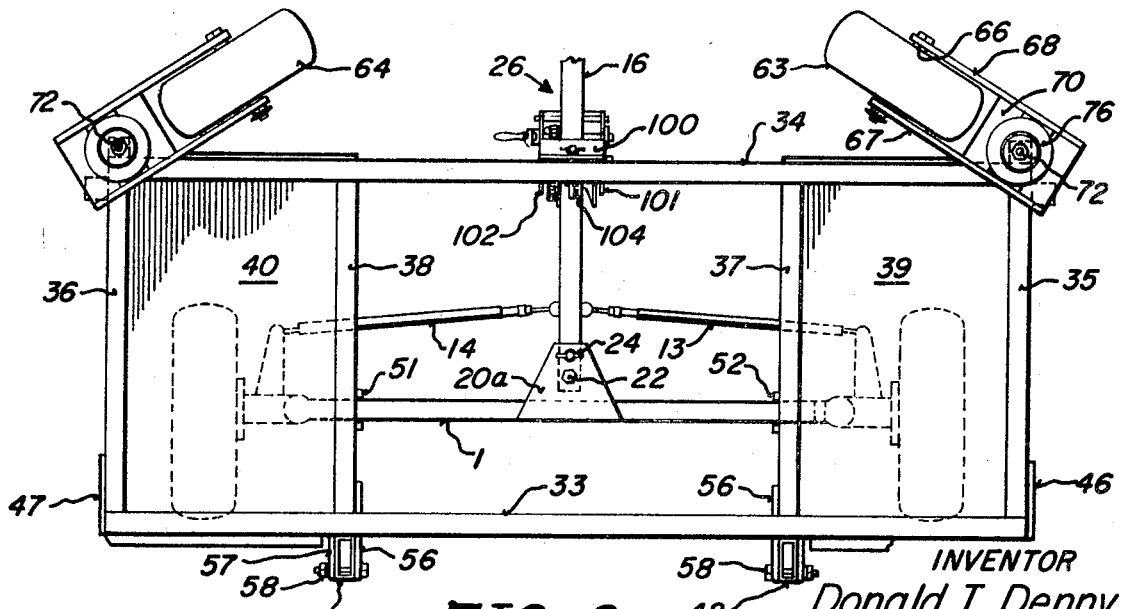
FIG. 6 is a plan view of the collapsed form of the tailer shown in FIG. 4.

After a towing operation has been completed, and the towed vehicle has been removed from carrying platform 32, platform 32 is folded inwardly to the collapsed, storage position of non-use shown in FIGS. 4 and 6. To accomplish this with a minimum of effort, the winch cable is extended and secured around rear cross bar 34 of the carrier platform frame assembly. Winch handle 27 is then utilized to wind cable 96 onto the winch spool with the result that platform 32 will be swung upwardly and forwardly to the collapsed position shown in FIG. 4. When folded or collapsed completely inwardly, platform 32 is supported in this position in overlying relation to draw bar 16 by engaging rear cross bar 34 of the platform frame assembly within a bracket device provided on top of winch assembly 26 at an elevated level above draw bar 16. As may be noted most clearly by reference to FIGS. 1 and 3, the bracket device is comprised of a front, apertured plate 100 and a pair of right angle retention fingers 101 and 102 spaced rearwardly therefrom. With rear cross bar 34 resting between fingers 101, 102 and upright bracket plate 100, carrier platform 32 is secured in the collapsed position shown in FIG. 4 by inserting a removable lock pin 104 through bracket plate 100 and cross bar 34. A spring clip is utilized to hold lock pin 104 in place. When towing the trailer in the collapsed position of non-use shown in FIGS. 4 and 6, it is preferable to lock swivel wheels 63 and 64 in an inwardly turned position. After wheels 63 and 64 are swung inwardly to the position shown in phantom lines in FIG. 5 and in the storage position of FIGS. 4 and 6, locking rod 78 is urged downwardly into engagement with aperture 87 in wheel mounting bracket 70. Rod 78 is then locked in place by twisting retention lug 80 into engagement with slot 88 in bracket 90. The locking of swivel wheels 63 and 64 when towing the trailer in its collapsed position of non-use, insures that these swivel wheels will not swing in and out.

It is to be noted that the use of rearwardly extending support arm assemblies 48,49 mounted on axle 1 and extending rearwardly therefrom provides several important advantages with respect to the collapsing of platform 32 to a forwardly disposed position over draw bar 16. By pivotally connecting the inner end of platform 32 to the outer ends of support arm structures 48,49 at locations to the rear of and above axle 1, I permit platform 32 to be freely pivoted upwardly and forwardly over draw bar 16 without interference or obstruction of axle 1 or the draw bar with any portion of the rectangular frame structure defining platform 32. This platform mounting arrangement also insures that the upright wall structure defined by posts 42,43 and stop plates 44,45 will not strike axle 1 when platform 32 is pivoted forwardly to its storage position. The pivotal connection of the inner end of platform 32 to arm assemblies 48,49 at locations rearwardly of trailer wheels 2 and 4 insures that platform 32, which is wider than the lateral space between wheels 2 and 4 to provide for the towing of large vehicles, will clear wheels 2 and 4 in both its rearwardly extended and forwardly collapsed positions. As may be noted most clearly by reference to FIG. 4, upright posts 42 and 43 being connected at their upper ends to the top of upwardly extending mounting plates 56 and 57 of the support arm structures 48,49, will be inverted about pivot bolt 58 as platform 32 is pivoted forwardly a full 180° to its storage position. By virtue of this arrangement, posts 42,43 will extend upwardly from pivot bolts 58 in the manner shown in FIG. 4 and will support platform 32 at an elevated level above wheels 2 and 4 when the platform is swung forwardly over draw bar 16 to its storage position.

Those familiar with the trailer art will appreciate that the support arm arrangement disclosed herein provides a particularly convenient and advantageous way of collapsing an elongated trailer platform from the extended position of use shown in FIG. 3 to a compact position of non-use in overlying relation to the trailer draw bar when a vehicle is not being towed. Bracket means 100, 101 and 102 provide a particularly simple and desirable way of supporting the carrier platform on the trailer draw bar when not utilizing the platform to tow a vehicle.

While I have shown and described my unique tow trailer with respect to certain preferred embodiments thereof, I anticipate that various changes may be made in the size, shape and arrangement of the various parts without departing from the spirit and scope of my invention as defined by the following claims.

What I claim is:

1. A vehicle tow trailer comprising:
an axle having wheels mounted on the opposite ends thereof;
a draw bar connected to said axle and extending forwardly therefrom;
a vehicle carrier platform having a forward, inner end supported on said axle by mounting means including a pivotal connection to said platform defining a horizontal axis about which said platform may be folded upwardly and forwardly from a rearwardly extending position of use to a collapsed storage position in overlying relation to said draw bar;
swivel wheel means on the outer end of said platform constructed and arranged to engage the ground and support said platform in a substantially horizontal position in cooperation with said mounting means when said platform is in said rearwardly extending position of use; and
support means mounted on said draw bar and extending thereabove to serve as a support rest to hold said outer end of said platform at an elevated level above said draw bar when said platform is folded to said collapsed position.

2. A vehicle tow trailer as defined in claim 1 wherein:
said vehicle carrier platform has an upright wall structure extending substantially perpendicular thereto at said inner end thereof against which the wheels of a towed vehicle abutt when said towed vehicle wheels are resting on said platform.

3. A vehicle tow trailer as defined in claim 2 wherein:
said platform mounting means comprises a pair of elongated support arm structures attached to said draw bar at laterally spaced locations thereon and extending rearwardly therefrom, said support arm structures being pivotally connected at their outer ends to said upright wall structure at locations rearwardly of said axle so that neither said axle or said draw bar is in the path of said upright wall structure when pivoting said carrier platform forwardly to said collapsed storage position.

4. A vehicle tow trailer as defined in claim 1 wherein:
said vehicle carrier platform has a width greater than the lateral space between said trailer wheels on said axle; and
said platform mounting means comprises a pair of support arm structures attached to said axle at laterally spaced locations thereon and extending rearwardly therefrom, the inner end of said platform being pivotally connected to the outer ends of said support arm structures at locations rearwardly of said trailer wheels whereby said platform is supported in its entirety rearwardly of said wheels, and said pivotal connections of said platform to said support arm structures being at such elevations as to permit said platform to clear said trailer wheels when said platform is folded upwardly and forwardly to said collapsed storage position.

5. A vehicle tow trailer as defined in claim 4 wherein:
said vehicle carrier platform has an upright wall structure at said inner end thereof serving as a stop device for the wheels of a towed vehicle having one end thereof supported on said platform; and
upwardly projecting extensions on the outer ends of said support arm structures, said upright wall structure being pivotally connected at its upper end to the upper ends of said extensions, whereby said wall structure will be inverted when said platform is folded to said collapsed storage position and will support said platform at an elevated level above said wheels.

6. A vehicle tow trailer as defined in claim 5, and further including:
removable lock pins securing the lower end of said wall structure to the lower ends of said extensions to hold said platform in said substantially horizontal, rearwardly extending position of use.

7. A vehicle tow trailer as defined in claim 1 wherein:
said swivel wheels means includes at least one swivel wheel and a manual locking device associated therewith operable to selectively lock said swivel wheel in either a straight back position or in an inwardly turned position.

8. A vehicle tow trailer as defined in claim 1 wherein:
said platform includes a substantially rectangular frame structure having cross bars extending transversely to said draw bar; and
said platform mounting means comprises a pair of elongated support arm structures attached to said axle at laterally spaced locations thereon and extending rearwardly therefrom, said support arm structures being pivotally connected at their outer ends to said inner end of said platform at locations above said axle, whereby said frame structure will not be obstructed by said axle or said draw bar when pivoted to its forwardly collapsed storage position.

9. A vehicle tow trailer comprising:
an axle having wheels mounted on the opposite ends thereof;
a draw bar connected to said axle and extending forwardly therefrom;
a vehicle carrier platform having a width greater than the lateral space between said trailer wheels and pivotally supported at its forward, inner end of said axle by mounting means including a pivotal connection to said platform defining a horizontal axis about which said platform may be folded upwardly and forwardly from a rearwardly extending position of use to a collapsed storage position in overlying relation to said draw bar, said pivotal connection being located rearwardly of said trailer wheels at such an elevation that said platform will clear said trailer wheels when in its rearwardly extending position of use or when pivoted upwardly and forwardly to said collapsed storage position; and swivel wheel means on the outer end of said platform which engage the ground and support said platform in a substantially horizontal position in cooperation with said mounting means when said platform is in said rearwardly extending portion of use.

10. A vehicle tow trailer as defined in claim 9, and further including:

a winch assembly mounted on said draw bar and a support rest on said winch assembly so located as to receive the outer end of said platform when said platform is folded to said collapsed position so as to thereby hold said platform at an elevated level above said draw bar when said platform is in said collapsed, storage position.

* * * * *